United States Patent [19]

Böettcher et al.

[11] 4,177,340

[45] Dec. 4, 1979

[54] MANUFACTURE OF HIGH-PRESSURE POLYETHYLENE

[75] Inventors: Klaus Böettcher; Heinrich G. Höerdt; Klaus Pfleger; Wieland Zacher, all of Wesseling; Hans Gropper, Ludwigshafen, all of Fed. Rep. of Germany

[73] Assignee: BASF Aktiengesellschaft, Fed. Rep. of Germany

[21] Appl. No.: 855,896

[22] Filed: Nov. 30, 1977

[30] Foreign Application Priority Data

Dec. 18, 1976 [DE] Fed. Rep. of Germany ....... 2657475

[51] Int. Cl.$^2$ ............................................ C08F 210/02
[52] U.S. Cl. .................................... 526/329; 526/213; 526/352
[58] Field of Search .................. 526/213, 329, 352

[56] References Cited

U.S. PATENT DOCUMENTS

| | | | |
|---|---|---|---|
| 2,953,551 | 9/1960 | White | 526/329 |
| 3,089,897 | 5/1963 | Balmer et al. | 526/329 |
| 3,132,120 | 5/1964 | Graham et al. | 526/329 |
| 3,141,870 | 7/1964 | Deex | 526/329 |
| 3,714,135 | 1/1973 | Pfannmueller et al. | 526/329 |
| 3,726,842 | 4/1973 | Trieschmann et al. | 526/329 |

*Primary Examiner*—Harry Wong, Jr.
*Attorney, Agent, or Firm*—Keil & Witherspoon

[57] ABSTRACT

A process for the manufacture of ethylene polymers by polymerizing ethylene under high pressures and at high temperatures in the presence of from 0.01 to 0.5 percent by weight of an alkyl ester (alkyl being of 1 to 8 carbon atoms) of an alkenemonocarboxylic acid of 3 or 4 carbon atoms. n-Butyl acrylate is a particularly suitable polymerization activator. Although the start temperature of the ethylene polymerization is relatively low, there is no difference in mechanical and optical properties of a blown film manufactured from the resulting ethylene polymer and of a blown film of pure polyethylene.

4 Claims, No Drawings

MANUFACTURE OF HIGH-PRESSURE POLYETHYLENE

The present invention relates to a process for the manufacture of high-pressure polyethylene.

In this process, the ethylene is polymerized in a polymerization zone under pressures of from 1,000 to 4,000 bars at from 100° to 450° C., with mean residence times of from 30 to 120 seconds, by passing a mixture of ethylene and oxygen, with or without a polymerization regulator, continuously through the polymerization zone.

In the high-pressure polymerization of ethylene in the presence of an initiator, the highly compressed ethylene must first be brought to a certain temperature before the exothermic polymerization starts. Thus, in the conventional pressure range of from 1,000 to 4,000 bars it is necessary, at the beginning of the reaction, to heat the polymerization mixture, consisting of ethylene and atmospheric oxygen, to above 170° C. by means of preheat zones, i.e. heat exchangers which are usually steam-heated. Above this start temperature, the exothermic polymerization commences. The heat of polymerization liberated is in part consumed for further heating of the polymerization mixture and in part removed by cooling the walls of the polymerization reactor.

Lowering the start temperature would permit the use of different reaction conditions and allow energy to be saved, since the polymerization mixture would no longer have to be heated to the same extent in the preheat zone.

In a conventional process, peroxides are used as polymerization initiators. Depending on the decomposition temperatures of the peroxides used, the start temperature can be lowered or raised. The use of peroxides which decompose at lower temperatures in order to lower the start temperature, however, has the disadvantage that very many free radicals are liberated very rapidly and the polymerization starts too vigorously, so that the heat of polymerization can no longer be removed sufficiently rapidly and the reaction mixture may suffer decomposition.

Technically, the handling, as polymerization initiators, of peroxides which decompose easily also entails numerous difficulties. Thus, expensive precautionary measures are necessary for the storage of the peroxides. Before being used for the polymerization, the peroxides must be diluted with solvents and because of the danger of decomposition the peroxide solutions must be injected into the reactor by means of special pumps, against the full reaction pressure.

It would be a substantial simplification if, when using atmospheric oxygen as the polymerization initiator—which use presents no problems—it were possible to lower the start temperature. It is therefore an object of the present invention to avoid the above disadvantages and to provide a high-pressure polymerization process in which ethylene is polymerized with atmospheric oxygen as the polymerization initiator, but the start temperature is lower.

We have found that this object is achieved by providing a process in which the reaction mixture of ethylene and oxygen additionally contains from 0.01 to 0.5 percent by weight, based on the ethylene, of an alkyl ester (where alkyl is of 1 to 8 carbon atoms) of an alkenemonocarboxylic acid of 3 or 4 carbon atoms. In a preferred embodiment of the process, the mixture contains from 0.05 to 0.25 percent by weight of the alkenemonocarboxylic acid ester.

A process in which the mixture contains from 0.01 to 0.5, preferably from 0.05 to 0.25, percent by weight of n-butyl acrylate as the alkenemonocarboxylic acid ester is particularly preferred.

Processes for the manufacture of ethylene polymers by polymerizing ethylene in a polymerization zone under pressures of from 1,000 to 4,000 bars at from 100° to 450° C., with mean residence times of the reaction mixture in the polymerization zone of from 30 to 120 seconds, a mixture of ethylene and oxygen, with or without a polymerization regulator, being passed continuously through the polymerization zone, have been disclosed and are described, for example, in Ullmanns Encyklopädie der technischen Chemie, 3rd edition, published by Urban & Schwarzenberg, Munich-Berlin, 1963, volume 14, pages 138–148. In order to carry out the high-pressure polymerization process continuously, a suitable polymerization zone has proved to be a tubular reactor with a tube diameter to tube length ratio of from 1:20,000 to 20:20,000. The reaction tube is usually surrounded by a jacket tube which contains the heat transfer medium. The pressure in the reaction tube in which the polymerization takes place is from 1,000 to 4,000, preferably from 1,500 to 3,000, bars. The mean residence time of the reaction mixture in the reaction tube, defined by the ratio of the volume of the apparatus to the mean volume of product passing through the apparatus volume per unit time, is from 30 to 120 seconds. Oxygen, which acts as the polymerization initiator, is conventionally present in the reaction mixture in amounts of from 5 to 200, preferably from 10 to 100, mole ppm, based on the ethylene. The polymerization can be carried out in the presence of conventional polymerization regulators, e.g. hydrogen, ketones, alcohols, ethers, hydrocarbons, aldehydes or olefins. Propylene and propionaldehyde may be mentioned as polymerization regulators. The polymerization regulators are conventionally employed in amounts of from 0.2 to 5 mole percent, based on the ethylene. The polymerization is carried out in the absence of a solvent. Any small amounts of an inert solvent, e.g. benzene, in which the additives may be dissolved, are negligible compared to the other starting materials. The temperature of the reaction mixture in the reaction tube is from 100° to 450° C., preferably from 250° to 350° C. To reach the start temperature, at which the polymerization commences, the reaction mixture consisting of ethylene and oxygen, with or without a regulator, must pass through a preheat zone before reaching the polymerization zone. In this preheat zone the reaction mixture is heated with steam which is at an average temperature above 170° C., preferably from 173° to 180° C. The preheat zone can, in the interest of better temperature control, be divided into several sections, preferably two sections. These may be heated with steam at different temperatures. The average temperature is the mean of the heating temperatures, weighted in accordance with the heating surface in the individual sections.

After preheating, the reaction commences, and as a result of the heat of polymerization liberated, temperatures of up to 450° C., preferably up to 350° C., are reached in the polymerization zone which adjoins the preheat zone.

After the ethylene has polymerized, the reaction mixture leaves the polymerization zone, i.e. the reaction tube, and after cooling and letting down to pressures below 500 bars it passes into a high-pressure product isolation zone or high-pressure separator. From the high-pressure product isolation zone the polymer, which still contains small amounts of monomer, is passed into a downstream low-pressure product isolation zone or low-pressure separator, where the pressure is less than 10 bars. From there, the polyethylene is usually fed into a discharge extruder.

According to the process of the invention, the reaction mixture of ethylene and oxygen, with or without polymerization regulator, additionally contains from 0.01 to 0.5, preferably from 0.05 to 0.25, percent by weight, based on ethylene, of an alkyl ester (where alkyl is of 1 to 8 carbon atoms) of an alkenemonocarboxylic acid of 3 or 4 carbon atoms, before it enters the preheat zone and, from there, the polymerization zone. For this purpose, the unsaturated ester, which may be described as a polymerization activator, is metered into the reaction mixture under low pressures of less than 100 bars, preferably from 10 to 25 bars; the same equipment as that employed for metering the polymerization regulator may be used. The ester itself preferably consists of an alkyl ester (where alkyl is of 1 to 8 carbon atoms) of acrylic acid or methacrylic acid. Examples are n-butyl acrylate, cyclohexyl acrylate, n-propyl acrylate and n-hexyl acrylate. In an advantageous embodiment of the process of the present invention, n-butyl acrylate is used as the activator.

An essential aspect of the process according to the invention is the extremely small amount of the unsaturated ester, i.e. from 0.01 to 0.5, preferably from 0.05 to 0.25, percent by weight. In contrast to the copolymerization of ethylene with acrylate esters, which is already disclosed in the literature and where the content of comonomer in the polymer is usually several percent by weight, it is possible to lower the start temperature to an average value of less than 170° C. and to influence the course of the polymerization even with very small amounts of an alkyl acrylate. Amounts of alkyl acrylates which give less than 0.5 percent by weight of acrylate ester as copolymerized units in the final polymer, suffice. Given this low content of copolymerized acrylate ester, the polymer obtained does not differ from an ethylene homopolymer and does not show the typical properties of ethylene/acrylate ester copolymers. The polymers obtained have melt indices of from 0.1 to 40 g/10 min (ASTM-D-1238-65T at 190° C. and 2.16 kg) and densities of from 0.915 to 0.935 g/cm$^3$ (DIN 53,479/72). The mechanical and optical properties of a blown film manufactured from the products do not differ from those of a polyethylene which has been manufactured by the same process, but without the presence of an alkyl acrylate.

The advantage achieved by the invention is in particular that the start temperature of the ethylene polymerization can be lowered by means of this unsaturated ester without adversely affecting the properties of the ethylene polymer obtained and without entailing substantial expense in respect of storage and handling of the ester. The unsaturated ester can be added to the ethylene even at low pressures of less than 10 bars and can pass through the subsequent compression stages without the danger of decomposition. The lowering of the start temperature of the polymerization not only influences the tendency of the ethylene to polymerize, but also the entire course of the polymerization.

EXAMPLE 1 (COMPARATIVE)

A polymerization reactor is fed with a mixture, compressed to 3,000 bars, consisting of 10,000 parts by weight of ethylene, 2.4 parts by weight of propionaldehyde and 12 mole ppm of oxygen, based on ethylene. The propionaldehyde and oxygen were added to the ethylene at 17 bars. The mixture is heated in a preheat zone having an average temperature of 173° C. Thereafter, the reaction commences and temperatures in the polymerization zone of up to 330° C. are reached as the result of the heat of polymerization liberated. A polymer having a melt index of 0.2 g/10 min and a density of 0.922 g/cm$^3$ is thus obtained, with a conversion of about 26% by weight.

EXAMPLE 2

A polymerization reactor is fed with a mixture, compressed to 3,000 bars, consisting of 10,000 parts by weight of ethylene, 2.4 parts by weight of propionaldehyde, 5 parts by weight of n-butyl acrylate and 12 mole ppm of oxygen, based on ethylene.

The propionaldehyde, n-butyl acrylate and oxygen were added to the ethylene at 17 bars. The mixture is heated in a preheat zone having an average temperature of only 165° C. Thereafter, the reaction commences and temperatures in the polymerization zone of up to 330° C. are reached. The mean residence time is about 50 seconds. A polymer having a melt index of 0.2 g/10 min and a density of 0.922 g/cm$^3$ is thus obtained, with a conversion of about 26% by weight. The polymer obtains about 0.2% by weight of n-butyl acrylate as copolymerized units. A blown film does not differ in respect of the tested properties, namely tensile strength, tear strength and elongation, from a blown film produced from the polymer manufactured as described in Example 1.

We claim:

1. In a process for the manufacture of an ethylene polymer by polymerizing ethylene in a polymerization zone at pressures of from 1,000 to 4,000 bars and at temperatures of from 100° to 450° C., with a mean residence time of from 30 to 120 seconds, by continuously passing a mixture of ethylene and oxygen, with or without a polymerization regulator, through a polymerization zone, the improvement which consists essentially of adding to the polymerization mixture from 0.01 to 0.5% by weight, based on ethylene, of an alkyl ester of an alkenemonocarboxylic acid of 3 or 4 carbon atoms, said alkyl moiety containing from 1 to 8 carbon atoms, passing the polymerization mixture containing the alkenemonocarboxylic acid ester through a preheat zone, whereby ethylene polymerization is initiated at an average effective start temperature of less than 170° C.; and passing the initiated polymerization mixture to the polymerization zone, whereby the start temperature of the ethylene polymerization is lowered without changing the properties of the resultant polymer.

2. A process as set forth in claim 1, in which the mixture contains from 0.05 to 0.25 percent by weight of the unsaturated ester.

3. A process as set forth in claim 1 or 2, in which the mixture contains n-butyl acrylate as the alkenemonocarboxylic acid ester.

4. A process as set forth in claim 1, wherein the alkenemonocarboxylic acid ester is added at effective pressures of less than 100 bars.

* * * * *